No. 705,332. Patented July 22, 1902.
V. FLECKENSTEIN.
MACHINE FOR MAKING MATS FOR BOTTLE COVERS, &c.
(Application filed Oct. 22, 1900.)
(No Model.) 7 Sheets—Sheet 1.

WITNESSES.

INVENTOR
VALENTINE FLECKENSTEIN
BY Morden & Darby
HIS ATTORNEYS

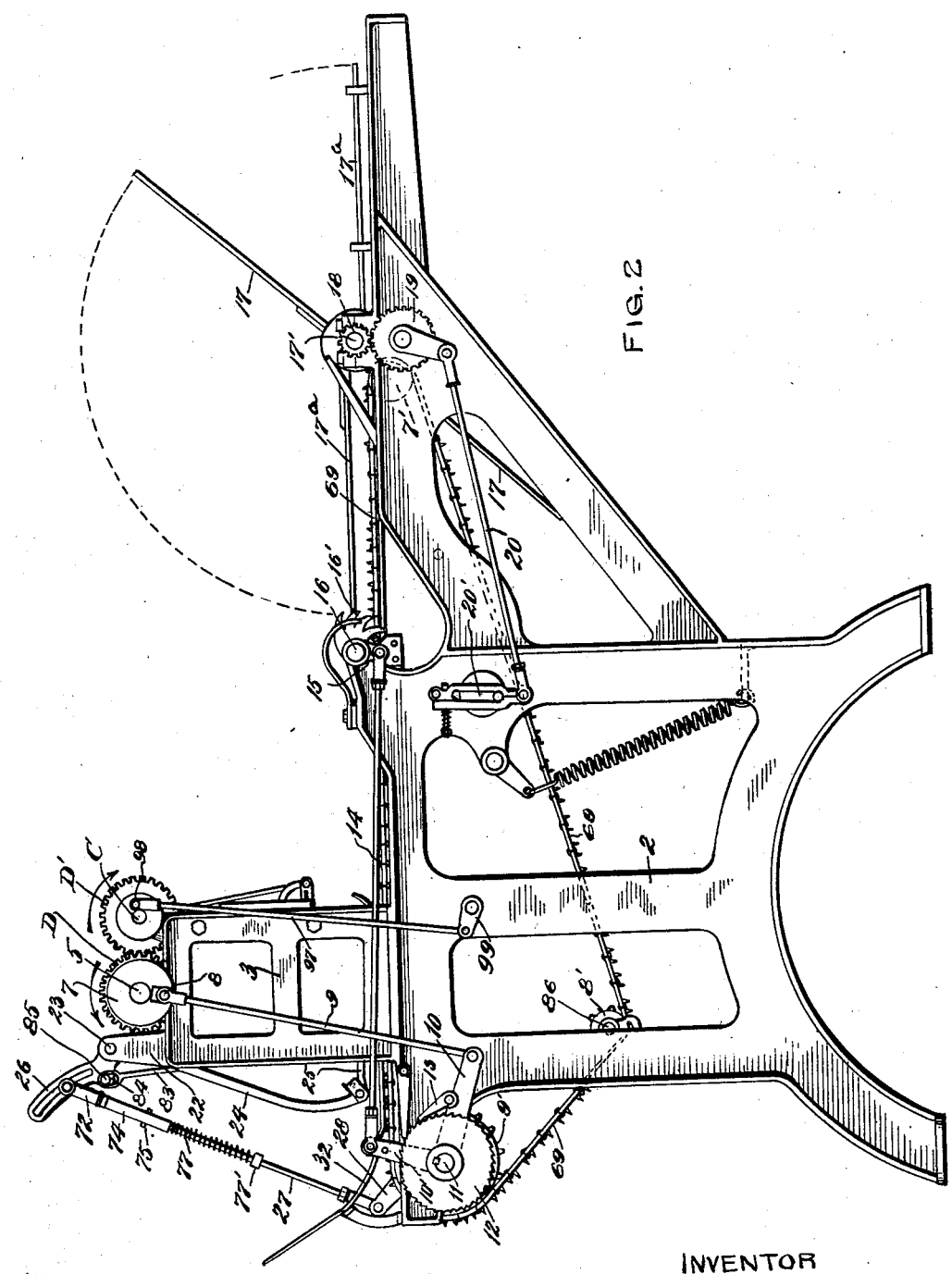

No. 705,332. Patented July 22, 1902.
V. FLECKENSTEIN.
MACHINE FOR MAKING MATS FOR BOTTLE COVERS, &c.
(Application filed Oct. 22, 1900.)
(No Model.) 7 Sheets—Sheet 3.
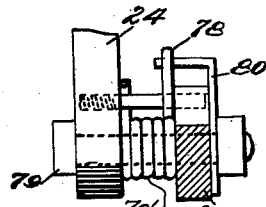
FIG. 13.
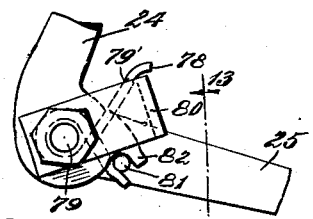
FIG. 14.
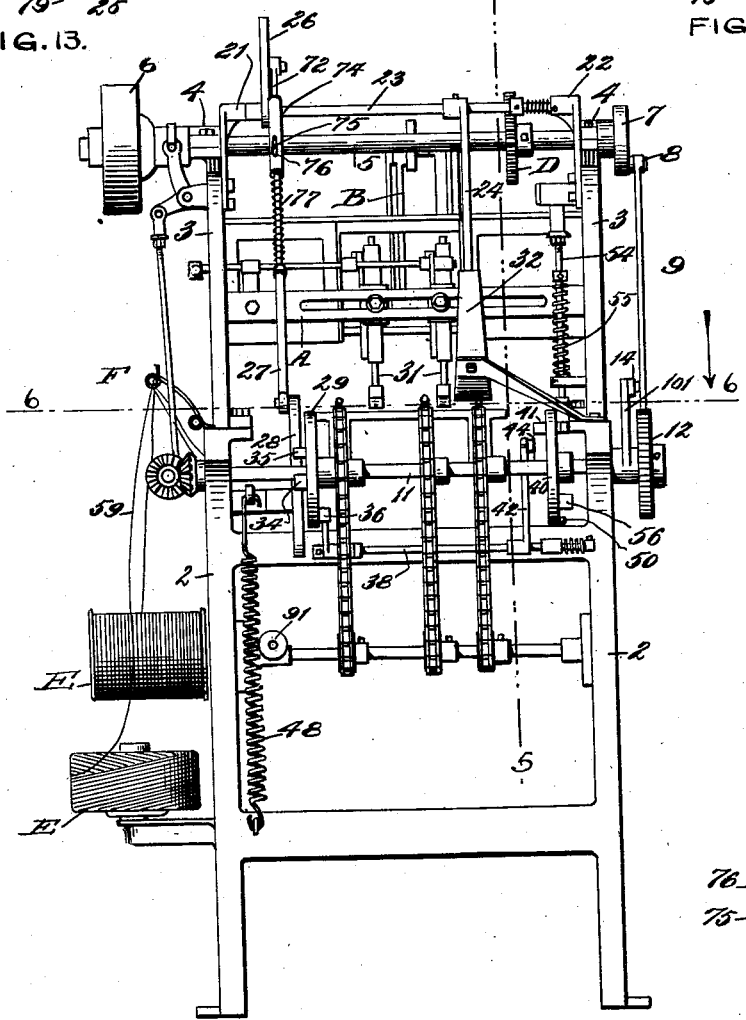
FIG. 3.
FIG. 15.
WITNESSES
E. G. Stenna
JB Weir
INVENTOR
VALENTINE FLECKENSTEIN
BY Brown & Darby
HIS ATTORNEYS.

No. 705,332. Patented July 22, 1902.
V. FLECKENSTEIN.
MACHINE FOR MAKING MATS FOR BOTTLE COVERS, &c.
(Application filed Oct. 22, 1900.)
(No Model.) 7 Sheets—Sheet 4.

WITNESSES
E.G. Staude
JB Weir

INVENTOR
VALENTINE FLECKENSTEIN
BY Brown & Darby
HIS ATTORNEYS.

No. 705,332. Patented July 22, 1902.
V. FLECKENSTEIN.
MACHINE FOR MAKING MATS FOR BOTTLE COVERS, &c.
(Application filed Oct. 22, 1900.)

(No Model.) 7 Sheets—Sheet 5.

WITNESSES

INVENTOR
VALENTINE FLECKENSTEIN
BY
HIS ATTORNEYS

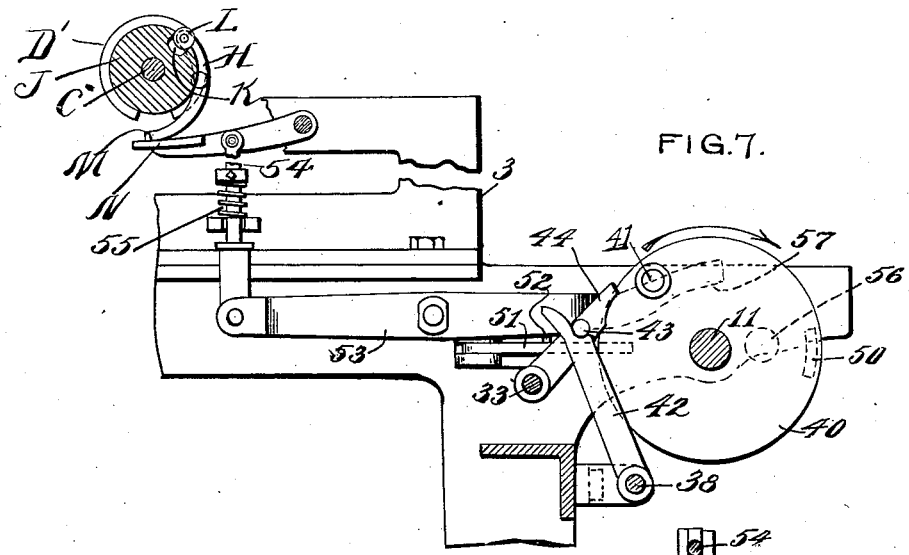

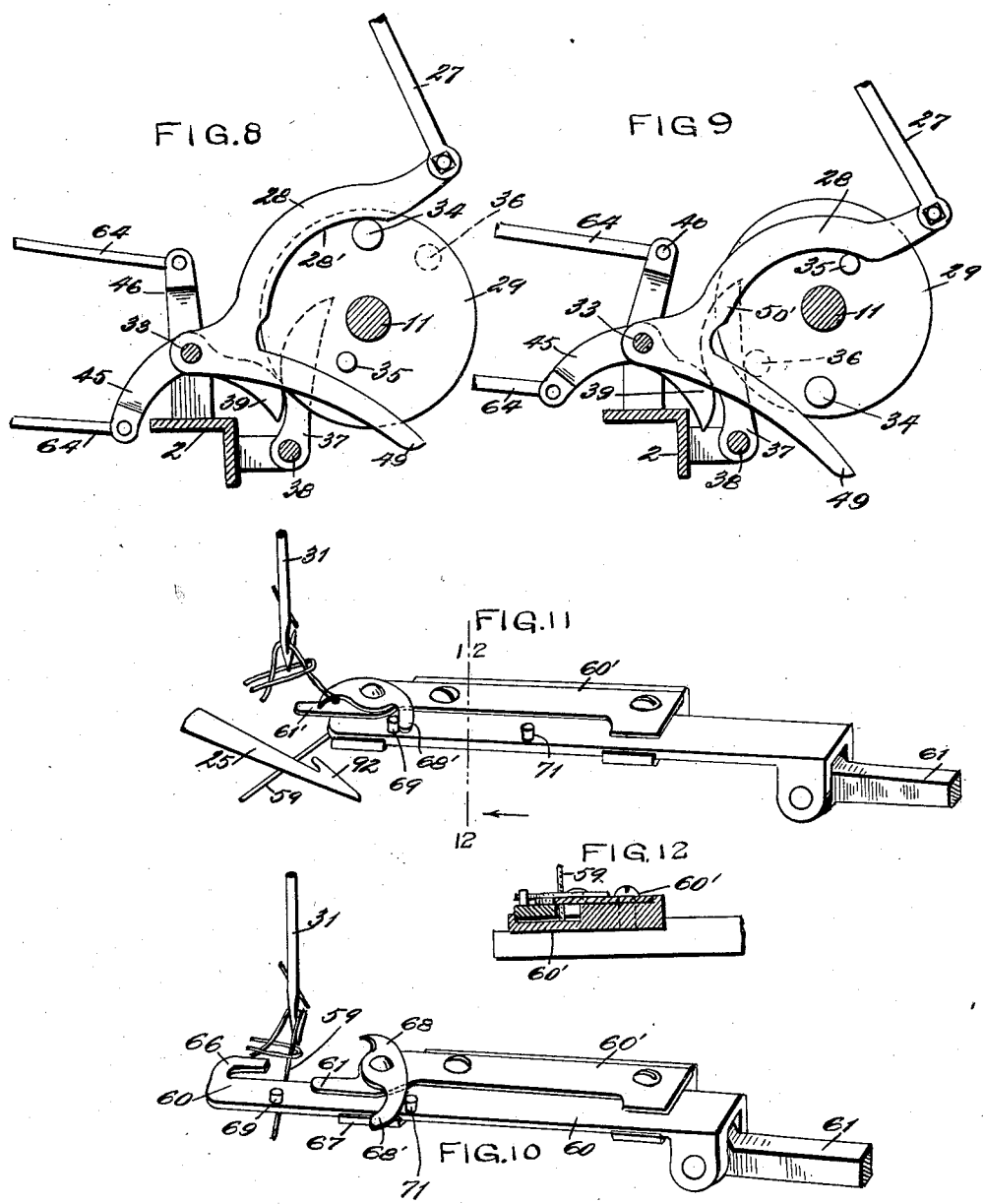

UNITED STATES PATENT OFFICE.

VALENTINE FLECKENSTEIN, OF ST. PAUL, MINNESOTA, ASSIGNOR TO THE NORTHWESTERN GRASS TWINE COMPANY, OF ST. PAUL, MINNESOTA, A CORPORATION OF IOWA.

MACHINE FOR MAKING MATS FOR BOTTLE-COVERS, &c.

SPECIFICATION forming part of Letters Patent No. 705,332, dated July 22, 1902.

Application filed October 22, 1900. Serial No. 33,910. (No model.)

*To all whom it may concern:*

Be it known that I, VALENTINE FLECKENSTEIN, a citizen of the United States, residing at St. Paul, in the county of Ramsey and State of Minnesota, have invented a new and useful Machine for Making Mats for Bottle-Covers and other Purposes, of which the following is a specification.

This invention relates to machines for making mats for bottle-covers and other purposes, and is an improvement on the construction set forth in my application, Serial No. 711,829, filed April 5, 1899.

The object of the invention is to provide means which are simple and efficient for securing a given length of slack in the cord or stitching-thread before the beginning of the operation of stitching each mat.

A further object is to provide means for this purpose which is positive and accurate in operation and which is not liable to get out of order or repair.

A further object is to provide a tension device that will yield up the cord at the proper moment in the operation of the machine.

Other objects of the invention will appear more fully hereinafter.

The invention consists, substantially, in the construction, combination, location, and relative arrangement of parts, all as will be more fully hereinafter set forth, as shown in the accompanying drawings, and finally pointed out in the appended claims.

Figure 1:
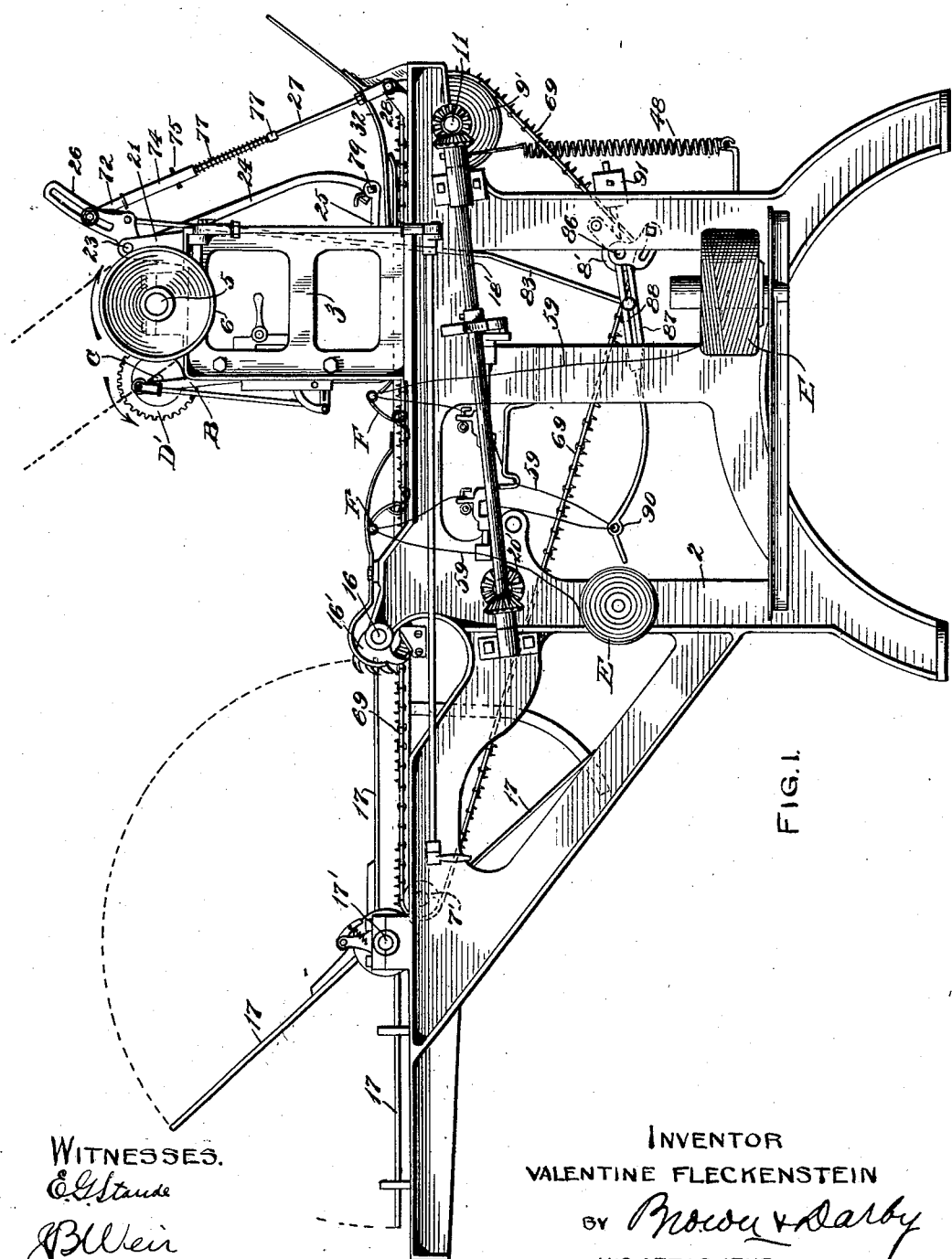
Figure 4:
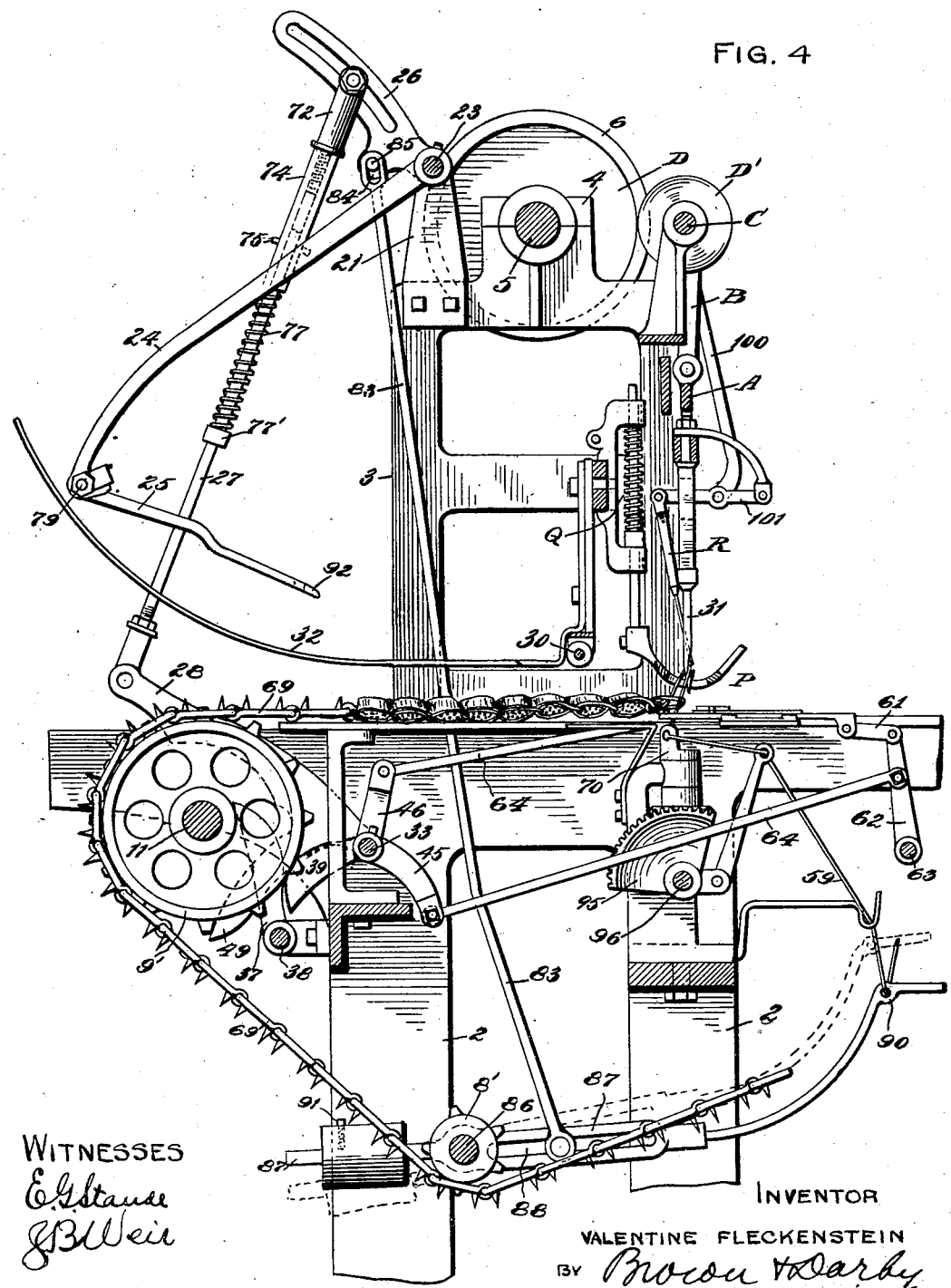
Figure 5:
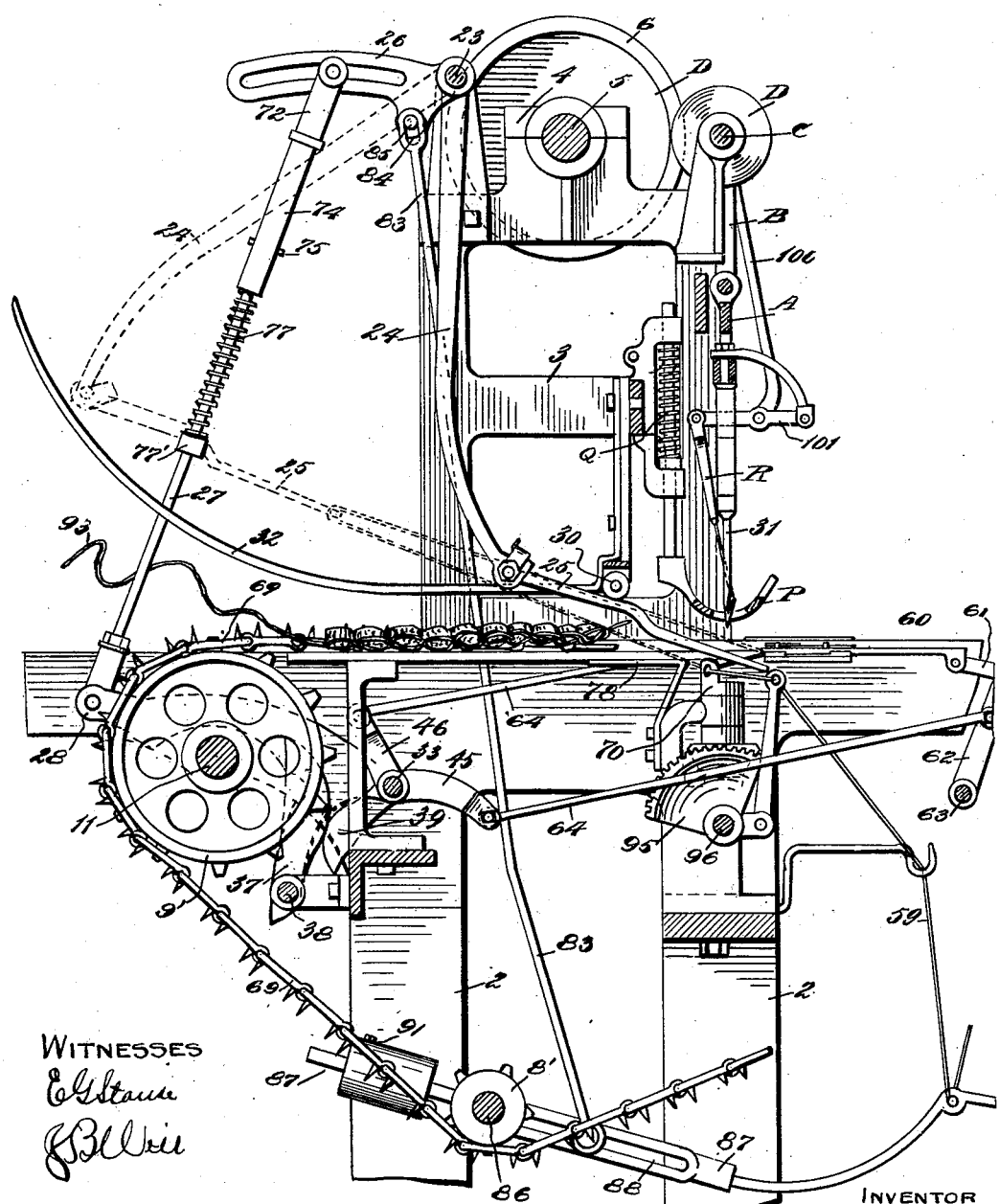

Referring to the accompanying drawings, and to the various views and reference-signs appearing thereon, Figure 1 is a view in side elevation of a machine embodying the principles of my invention. Fig. 2 is a view similar to Fig. 1, taken from the opposite side of the machine. Fig. 3 is a rear end elevation. Fig. 4 is an enlarged broken sectional view on the line 5 5, Fig. 3, looking in the direction of the arrow. Fig. 5 is a view similar to Fig. 4, showing a displaced position of the parts. Fig. 6 is a broken detail view in the horizontal section on the line 6 6, Fig. 3, looking in the direction of the arrow. Fig. 7 is a broken detail view in section on the line 7 7, Fig. 6, looking in the direction of the arrow. Fig. 8 is a broken detail view in section on the line 8 8, Fig. 6, looking in the direction of the arrow. Fig. 9 is a view similar to Fig. 8, showing another position of the parts. Fig. 10 is a detached detail broken view in perspective of the clamping and cutting device, showing the jaws in open position. Fig. 11 is a similar view showing the jaws closed. Fig. 12 is a transverse section on the line 12 12, Fig. 11. Fig. 13 is a broken detailed view in section on the line 13 13, Fig. 14, showing the finger tension. Fig. 14 is a side view of the same. Fig. 15 is a broken detail view, in longitudinal section, of the tension-rod.

The same part is designated by the same reference-sign wherever it occurs throughout the several views.

Reference-sign 2 designates the framework of the machine and is so constructed and arranged as to support the various working parts, hereinafter to be referred to. Suitably journaled in bearings 4, formed in or carried by standards or brackets 3, is the main drive-shaft 5, adapted to receive rotation from any suitable or convenient source, as through pulley 6, and from which the various working parts are operated. Suitably journaled in bearings formed in the frame 2 and extending transversely of said frame is a shaft 11, arranged to be intermittently rotated, or, to be more correct, said shaft is arranged to be rotatively actuated intermittently from main shaft 5—as, for instance, by means of a ratchet-wheel 12, mounted on said shaft and engaged by a pawl 13, carried by an arm 10 of a bell-crank lever, the latter being pivoted concentric with the axis of shaft 11. A rocking motion is imparted to arm 10 through a connecting-rod 9, which is connected at one end to the free end of said arm 10 and at the other end to a crank-arm 8, adjustably mounted in a slot in disk 7, mounted on shaft 5. From this construction it will be readily seen that when shaft 5 is rotated an intermittent rotative movement is imparted to shaft 11.

To the arm 10' of the bell-crank lever is connected one end of a connecting-rod 14, the other end of said rod being connected to a crank-arm 15, secured to shaft 16, journaled transversely in the frame 2, and upon which are mounted the trimming-cutters 16'.

A belt band or carrier 69, operating over sprocket-wheels 9' upon shaft 11 and over suitable guiding-sprockets 7' 8', serves to effect the feed of the material past the trimming-cutters and to the stitching mechanism, hereinafter to be referred to, and to deliver the finished mat.

The material to form the mat may be delivered to the carrier 69 in any suitable manner. In the drawings I have shown clamping-arms 17, adapted to receive the material in the form of flat masses or mats, each containing a sufficient quantity of the material to form a single bottle-cover, and when said arms are suitably actuated to deliver the same to the carrier 69. The arms 17 are mounted upon a shaft 17', driven by gears 18 19 through a rod 20, receiving motion from a transverse shaft 20', which is in turn driven from shaft 11 through a shaft 18'.

The construction and arrangement of the means for delivering the material to the carrier 69 and the actuating mechanism therefor are fully set forth, shown, and described in my pending application above referred to, and as the specific construction and arrangement thereof form no part of my present invention further description thereof is unnecessary herein.

Reference-signs 31 31 designate one or more needles carried in a frame A, adapted to be vertically reciprocated—as, for instance, by means of a pitman connection B with a shaft C, the latter being rotated from shaft 5 through gears D D' in the same manner as described in my prior application.

It is obvious that any number of needles 31 may be employed. I have shown only two, and under ordinary circumstances this number will be sufficient, as thereby two rows of stitches are provided transversely of the mat or bottle-cover.

The thread or cord 59 employed may be carried in the form of balls E, suitably supported upon a convenient part of the framework, and lead therefrom through suitable guides (indicated at F) to the looper 70 and thence to the cord-clamp hereinafter to be described and as clearly shown in Figs. 1, 4, 5, 10, and 11 and in proper position with reference to the needles.

The looper 70 is actuated by means of a segment-rack 95 from shaft C through rod or link 97, connecting the crank-arms 98 99.

P designates a presser-foot yieldingly supported, as through spring Q, upon the frame, the needle 31 operating through said presser-foot.

R designates a pin arranged in angular relation with respect to and coöperating with the needle. This pin is supported on the needle-frame A to move with the needle, but is capable of independent movement relative thereto by means of a reciprocating rod 100, operating from shaft C and connected to link 101, supported upon or from frame A and carrying the pin R.

The operation of the mechanism so far described is the same as in my prior application, and is as follows: Rotation is imparted to shaft 5, and from said shaft the various parts described are actuated. The material to form the covers is successively delivered to the carrier 69 by the clamp-arm 17 in the form of mats, each containing the required amount of material to form a single mat, and by such carrier the mats are carried past the trimming-cutters and the stitching mechanism, whereby it is reduced to proper length and is sewed or stitched, thereby forming bottle-covers. In the construction of such covers it is desirable to provide the same with a long loose end of cord or twine, as indicated at 93, Fig. 5, to form means for efficiently applying the cover to a bottle or other article to be wrapped therein. I employ for this purpose the same twine or cord used in stitching the mat, and one of the features of the present invention resides in the means for supplying this long loose end, and I will now proceed to describe the construction and arrangement for accomplishing this object.

Suitably supported in bearings 21 22, carried by bracket 3, is a shaft 23, and an arm 24 is mounted on said shaft to rock therewith. This arm carries a finger 25, which constitutes what I will designate a "cord-puller." In Fig. 4 the cord-puller is shown in its normal position with the machine and the parts thereof occupying their relative positions as the last stitch on a cover is about to be completed. At this moment the cord clamp and cutter, presently to be described, is actuated to cut the cord and to clamp the severed end, as indicated in Fig. 11. The shaft 23 is now rocked, as will presently be more fully described, thereby swinging arm 24 and hence projecting finger 25 from the position indicated in full lines in Fig. 4 and in dotted lines in Fig. 5 to that indicated in full lines in Figs. 5 and 11 and in position for the hooked end 92 of said finger to engage the cord 59, the end of which is held clamped by the clamping device, as clearly shown in Fig. 11. In its advancing movement the finger 25 engages a guide—such, for instance, as a roller 30—whereby it is guided into proper position to engage the thread or cord. When the hooked end 92 of finger 25 engages the cord properly, the shaft 23 is rocked in the opposite direction, thereby returning the arm 24 to its normal position, and the end of the cord remaining clamped in the clamping device such returning movement serves to draw the cord from the spool or reel and through the eye in the looper 70, as clearly shown in the dotted lines in Fig. 5, thereby securing a proper length of slack to serve as a loose or free end 93 for the next succeeding mat or cover. The clamping device now releases the end of the cord and the stitching operation is resumed automatically, as will be presently explained more fully, and the next mat or cover is stitched and the above operation is repeated. I prefer to employ a yielding connection between finger 25 and its supporting-arm 24 in order to permit of a desirable flexibility in the operation of said finger, whereby it may the more readily be brought into proper relation to engage the thread or cord and whereby undue rigidity is avoided. In Figs. 13 and 14 I have shown such yielding connection, wherein I mount a bolt 79 in the end of arm 24, and which bolt forms a pivotal connection between the arm 24 and finger 25. The arm 24 is provided with a heel or projection 82, against which works a pin 81, carried by finger 25. A spring 79' is coiled upon bolt 79, and one end thereof is arranged to engage pin 81, the other end of said spring bearing against a plate or projection 80. By this construction it will be seen that the spring 79' operates to constantly press the pin 81 in engagement with projection 82 and while permitting the finger 25 to rock or yield against the tension of such spring, thus securing a yielding connection between the arm 24 and the finger 25. If desired, a plate or bracket 78, carried by the frame, in which is supported the looper 70, may also aid in guiding the finger during the movement thereof to advanced positions.

While I have shown only one cord-puller, it is obvious that as many may be employed as desired—that is, a cord-puller may be provided for each needle by merely duplicating the arms 24 and the construction above described. Under ordinary circumstances, however, I supply each bottle-cover with only one loose end 93, and hence only one cord-puller is shown.

In order to protect the finger 25 and to prevent the same from carrying with it while being withdrawn the straw, hay, or the like forming the cover, I provide a shield 32, through which the finger 25 operates.

I will now describe the means and construction for positively and accurately operating the cord-puller. Suitably journaled in the framework 2, in advance of and slightly below the axis of shaft 11, and extending parallel with said shaft transversely of the machine is a shaft 33, upon which is loosely pivoted an arm 28, having a heel or projection 49. (See Figs. 8 and 9.) To the free end of arm 28 is connected a crank-arm 26, mounted on shaft 23, through intermediate connections, including a rod 27. The crank-arm 26 is slotted, as clearly shown, in order to secure a desirable range of adjustment. Mounted upon shaft 11 is a disk or wheel 29, carrying suitable projections—such, for instance, as rollers or pins 34 35—arranged when said shaft 11 is rotated to operate within the fork formed by the arms 49 and 28 to engage said arms to rock the same about the loose pivotal support afforded by shaft 33 for said arms. Thus the arm 28 is held in its extreme elevated position by roller or projection 34, and when in such extreme position the shaft 23 is so held as to maintain the cord-puller arm in its normal or retracted position, as seen in Fig. 4, and in order that said arm may be so held for a sufficient length of time to enable the other cycle of operations to be completed in their due and proper sequence and order the arm 28 is provided with a curved surface 28', which when the said arm is in its extreme raised position is on a curve concentric with the axis about which pin or roller 34 operates. In this manner the arm 28 is maintained elevated during a considerable travel of the cam projection 34. When the cam projection or roller or pin 34 has been advanced or carried beyond arm 28, thereby relieving said arm of its elevating support, said arm descends, thereby drawing rod 27, rocking shaft 23, and hence swinging the cord-puller arm 24 in a direction to advance the hooked finger 25, as above described, to position indicated in full lines in Fig. 5. The pin or projection 35 serves to limit the extent of descending movement of arm 28 and to support the same in its lowermost position, as shown in Fig. 9.

It will be seen that the arm 28 will be supported by pin or projection 35 for a definite length of time before said pin or projection is carried out of supporting position for said arm. This interval of time is sufficient to permit the cord cutter and clamp to perform their proper functions, as will presently be more fully explained. After the pin or roller 35 has been carried beyond supporting position for arm 28—that is, after the cord clamp and cutter have been actuated—the pin or roller 34 (see Fig. 9) is brought into engagement with the arm 49, thereby positively advancing rocking arm 28 to its lowermost limit of movement, and hence, through the connections actuated by said arm, fully and completely advancing the hooked finger 25 of the cord-puller to its extreme projected position to engage the cord, as indicated in Fig. 11.

It is desirable to provide a yielding connection between the arms 28 and 26 in order that the parts actuated thereby may be protected against breakage in case of undue obstruction in the operation of the cord-puller. Many different constructions for accomplishing this result may be devised and still fall within the spirit and scope of my invention. I have shown an illustrative construction which I have found admirably adapted for the purposes in view, wherein I employ a section 72 in the connection between arms 26 and 28, said section 72 being adjustably connected in the slot of arm 26 and provided with a threaded end 73, to which is secured a tubular portion 74, (see Fig. 15,) through which is formed a transverse slot 76. The end of rod 27 telescopes freely into the tubular portion 74 and is provided with a pin or projection 75, which operates in the slot 76. A spring 77 bears at one end against a collar 77' on rod 27 and at the other end against the end of the tubular portion. From this construction it will be seen that if the cord-puller encounters an undue obstruction while being returned after advancement to its normal position the spring 77 will permit the connection between arms 28 and 26 to yield, thereby preventing breakage.

I will now describe the construction and arrangement of cord clamp and cutter and the means for operating the same.

Referring to Figs. 10, 11, and 12, reference-sign 60' designates a guide suitably secured or mounted upon the frame of the machine and through which operates a slide 60. This slide is provided with a hooked end 66, arranged to receive therein the cord 59 after said cord has passed from the reel to and through the looper 70. The guide 60' is provided with a finger or projection 61', which coöperates with the hook 66' to effect a clamping action on the cord, as indicated in Fig. 11, when the slide 60 is moved into the proper clamping position. A cutter 68 is pivotally mounted on the guide 60' and is provided with a tail extension 68'. Carried by the slide 60 are the pins or projections 69 71, arranged to alternately engage the tail 68' to properly actuate the cutter 68, according as said slide is moved in one direction or the other. Thus when the slide 60 is moved to open position, as seen in Fig. 10, the pin or projection 71 engages the tail 68' and rocks the cutter 68 into open position. This movement also releases the clamped end of the cord and brings the hooked end 66 into position to again engage the thread or cord 59, as clearly shown. When the slide 60 is moved in the opposite direction, as seen in Fig. 11, the extension 61' coöperates with the neck of the hook 66 to clamp the cord therebetween and to securely hold the same, while at the same time the projection or pin 69 engages the tail 68' of the cutter and rocks the latter, so as to sever the cord. It is while the parts of the cord clamp and cutter are in this position that the cord-puller is advanced to again engage the cord as above explained. Therefore in the proper timing of the machine the operation of the cord-clamp and the cutter and of the cord-puller, as well as the other parts of the machine, should bear a definite and coöperative mutual relation toward each other. I will therefore now describe the means for operating the cord cutter and clamp in mutual coöperative relation with respect to the cord-puller. Somewhat in advance of pin or projection 34 upon wheel 29, but on the opposite face of the latter, is a similar pin or projection 36. (See Fig. 6 and dotted lines in Figs. 8 and 9.) This pin or projection is designed to engage an arm 37, secured upon a shaft 38, suitably journaled upon brackets of the main frame, when the wheel 29 is advanced into proper position (see Fig. 9) and to rock said arm 37 and shaft 38. The rear surface of said arm 37 is curved into cam shape and is arranged to engage a coöperating or cam-shaped surface on an arm 39, secured to shaft 33. By this arrangement it will be seen that when arm 37 is rocked into the position shown in Fig. 9 the arm 39 is thereby engaged and depressed, and consequently the shaft 33 is rocked. It will also be seen that by reason of the peculiar cam shape of the bearing-surfaces of said arms 37 and 39 the arm 39 will be positively locked in its depressed position so long as arm 37 is held in its rocked position by the pin or projection 36. Mounted upon shaft 33 to rock therewith are crank-arms 45 46, one for each cord clamp and cutter. These arms are connected, through rods 64, to arms 62, mounted on rock-shafts 63, (see Figs. 4 and 5,) and which arms are connected, through links 61, to the slides 60 of the cord-clamp. It will be understood that a cord clamp and cutter is associated with each needle, and the construction and arrangement is the same in each case. I have shown only one of the arms 64 connected to the cord-clamp, the other arm 64 being connected in a similar manner to a cord-clamp on the opposite side of the machine. Thus the rocking of shaft 33, as above described, effects an actuation of the cord-clamp to open position, thereby releasing the cord. Secured to shaft 33, to rock therewith, is an arm 47, to the free end of which is connected one end of a spring 48, (see Figs. 1, 3, and 6,) the other end of said spring being connected to the frame 2. The tension of this spring is exerted constantly to rock shaft 33 in a direction to cause the clamp-slide 60 to move to closed position, as shown in Fig. 11, and the construction above described operates to positively open said clamp. The shaft 33 is held and locked against rotative movement in a direction to close the cord-clamp and sever the cord by means of an arm 42, carried by shaft 38, and which arm is arranged to engage and form a support for a pin 43, carried by an arm 44, mounted on shaft 33. (See Figs. 6 and 7.) Thus it will be seen that as soon as the arm 44 is released the shaft 33, under the influence of spring 48, will be caused to quickly rock or rotate and through the arms 45 46 effect the cutting and clamping operations above described. The trip mechanism is restored to its normal position by means of a pin or projection 41, carried by a wheel 40, mounted on shaft 11, and which pin or projection engages the arm 44 and raises the same, thereby rocking shaft 33 against the action of spring 48. By the time the arm 44 is sufficiently raised the shaft 38 is rocked through the engagement of arms 39 and 37, thereby bringing the arm 42 into supporting relation with respect to the pin 43, and hence again placing the parts in position to be tripped for the next operation by the pin or projection 36 engaging arm 37.

In order to avoid danger of breaking the cord during the pulling operation of the cord-puller, it is desirable to provide means for securing sufficient slack in the cord to enable the cord-puller to perform its function without danger of breaking the cord. In order to accomplish this result, I employ a rod 83 and provide the same with an elongated slot 84, in which works a pin or projection 85 of arm 26. The other end of rod 83 is adjustably connected in a slot 88 of an arm 87, pivotally mounted on shaft 86. At the outer end of arm 87 is an eyelet 90, through which the cord 59 leads in its passage from the ball or reel to the looper and clamp device. Thus it will be seen that when arm 26 rocks in a direction to advance the cord-puller toward the position shown in full lines in Fig. 5 the rod 83 will also be projected, thereby rocking arm 87, and hence pulling the cord from the reel and through its guides, so as to yield up a sufficient slack to accommodate the pull of the cord-puller when the arm 26 is rocked back to its normal position without danger of breaking the cord. In order to counterbalance the weight of arm 87, I may employ a weight 91, adjustably mounted on the rear end of arm 87. By slotting the arm 83, as at 84, it will be seen that if the cord-puller requires a greater length of cord than the arm 87 has yielded the rod 83 will be permitted a longitudinal movement resulting from the consequent raising of arm 87 by the pull of the cord-puller, thereby avoiding danger of breakage.

I will now describe the mechanism for automatically starting and stopping the needle operating mechanism, particular reference being had to Fig. 7. As above explained, the needles are operated from shaft C, said shaft receiving rotation from main shaft 5 through gears D D'. The gear D' is mounted to freely revolve upon shaft C and carries a dog H, which is pivotally mounted thereon. A disk or wheel J is mounted on to rotate with shaft C and is provided with a notch or recess K in the periphery thereof, adapted to receive a pin or projection L, carried in one end of the pivoted dog H, thus constituting a clutch by which the driving-gear D' may be coupled to the shaft C. The tail M of dog H is arranged to be engaged by a pivoted arm M when said arm is rocked to disengage the clutch-dog. The arm N is actuated by a rod 54. A spring 55 is arranged to exert its tension in a direction to throw the arm N into engaging relation with the tail end of dog H. The rod 54 is held retracted against the tension of spring 55 by means of a lever 53, pivoted upon the frame of the machine. The lever 53 is normally supported upon a pin 52, carried by a laterally-swinging arm 51. A spring 58 serves to hold said arm in position for the lever 53 to rest on pin 52. Upon the face of wheel 40 is carried a cam projection 50, adapted to engage the arm 51 and swing the same laterally against the tension of spring 58, thereby carrying the pin 52 out of supporting relation with respect to lever 53, and hence permitting said lever to rock under the influence of spring 55 and projecting rod 54, thereby causing arm N to effect a disengagement of the clutch, and hence arresting the needle. A pin or projection 56 on wheel 40 is arranged to engage the end 57 of lever 53 and again raise the same into position for the supporting-pin 52 to form a support therefor until again tripped, as above explained. This elevation of lever 53 withdraws the arm N from engaging relation with respect to the tail of clutch-dog H and permits said dog to again effect a coupling of shaft C to its driving-gear D'.

From the foregoing description it will be seen that each of the parts of the machine is so relatively arranged, timed, and adjusted in its operation as to contribute to the accomplishment of the functions of all the other parts and the production of a machine which is simple, efficient, and positive in operation.

It is believed that the operation of the machine will be fully and clearly understood from the foregoing description, taken in connection with the accompanying drawings, and may be summarized briefly, as follows: The material is placed in the clamp-arms 17 in the manner set forth and is transferred to and deposited upon the carrier 69, by which such material in the form of a flat mat containing a sufficient quantity of the material to form a cover is conveyed or carried past the trimming-cutters 16' and is presented to the stitching mechanism. The clutch mechanism operated by lever 53 is tripped, and the needle-operating mechanism is thrown into action, and the mat will be stitched in the manner above described and as shown in Figs. 4 and 5. At the completion of the operation of stitching a mat the cord clamp and cutter are actuated to sever the cord and to clamp the loose end thereof, the cord-puller is advanced to engage the cord, and the arm 87 is actuated to provide a sufficient amount of slack cord. In the meantime the carrier 69 carries the stitched mat on toward the delivery end of the machine and advances a new mat into position to be stitched. The cord-puller is returned to its normal position, thereby drawing out the cord to form the loose end for the next succeeding mat. The needle mechanism is again started up and the cord-clamp opened. The operations are then repeated.

It is obvious that many variations and changes in the details of construction and arrangement would readily occur to persons skilled in the art and still fall within the spirit and scope of my invention. I do not desire, therefore, to be limited or restricted to the exact details shown and described; but What I do claim as new and useful and of my own invention, and desire to secure by Letters Patent, is—

1. In a bottle-cover machine, the combination with feeding and stitching mechanism, means for actuating the same, and a cord-clamp arranged to hold the cord in position to be engaged by the stitching mechanism, of a cord-puller comprising a vibratory arm, a finger yieldingly connected thereto, and means for vibrating said arm, as and for the purpose set forth.

2. In a bottle-cover machine, the combination with feeding and stitching mechanism, means for actuating the same, and a cord-clamp arranged to hold the cord in position to be engaged by the stitching mechanism, of a cord-puller comprising a vibratory arm, a finger yieldingly connected thereto, a guide for said finger, and means for vibrating said arm, as and for the purpose set forth.

3. In a bottle-cover-making machine, a cord-puller comprising a vibratory arm, a hooked finger, means for yieldingly connecting said finger to said arm, and means for vibrating said arm, in combination with stitch-forming mechanism and a cord clamp or holder, as and for the purpose set forth.

4. In a bottle-cover-making machine, a cord-puller comprising a vibratory arm having a shoulder, a finger pivotally connected to said arm, a spring arranged to maintain said finger in engagement with said shoulder, and means for vibrating said arm, in combination with stitch-forming mechanism and a cord clamp or holder, as and for the purpose set forth.

5. In a machine for making bottle-covers, feeding and stitching mechanism, and means for actuating the same, in combination with a rock-shaft, a crank-arm for rocking the same, a pivotally-mounted arm, means for periodically rocking the same, a tube connected to said crank-arm and provided with a transverse slot, a rod connected to said pivoted arm and arranged to telescope into said tube and having a pin operating in said slot, a spring interposed between said rod and tube, and a cord-puller actuated by said rock-shaft, as and for the purpose set forth.

6. In a machine for making bottle-covers, feeding and stitching mechanism, and means for actuating the same, in combination with a cord-clamp arranged to hold the cord in position to be engaged by the stitching mechanism, a rock-shaft, a cord-puller, a vibratory arm for providing slack in the cord between the cord-clamp and the cord-supply, and connections between said arm and shaft, whereby when the latter is rocked to advance the cord-puller to engage the slack portion of the cord the vibratory arm is also actuated, as and for the purpose set forth.

7. In a machine for making bottle-covers, feeding and stitching mechanism, and means for actuating the same, in combination with a cord-clamp arranged to hold the cord in position to be engaged by the stitching mechanism, a counterbalanced vibratory arm arranged to engage the cord at a point intermediate the cord-clamp and cord-supply to provide slack therein, a cord-puller, and connections intermediate said cord-puller and arm to vibrate the latter, as and for the purpose set forth.

8. In a machine for making bottle-covers, feeding and stitching devices, and means for actuating the same, in combination with a cord-clamp, a pivotally-mounted arm arranged to engage the cord, a cord-puller, a rock-shaft therefor, a crank-arm for rocking said shaft, and a rod connected to said crank and pivoted arms, said rod having loose connection to permit of movement thereof relative to said arms, as and for the purpose set forth.

9. In a machine for making bottle-covers, feeding and stitching devices, and means for actuating the same, in combination with a cord-clamp, a pivotally-mounted arm arranged to engage the cord, a cord-puller, a rock-shaft for actuating the same, a crank-arm mounted on said shaft and provided with a pin or projection, a rod having an elongated slot in which said pin or projection is received, said rod being connected at its other end to said pivoted arm, as and for the purpose set forth.

10. In a machine for making bottle-covers, feeding and stitching devices, and means for actuating the same, in combination with a cord-clamp, a pivotally-mounted arm arranged to engage the cord, a cord-puller, actuating means therefor, and a rod connected at one end to the cord-puller-actuating means and adjustably connected at the other end to said pivoted arm, as and for the purpose set forth.

11. In a machine of the class described, a rock-shaft, a spring arranged to exert its tension to rock said shaft in one direction, a stop for locking said shaft against rotation under the influence of said spring, stitch-forming mechanism, a cord-clamp, means actuated by said shaft for operating said clamp, and means for tripping said stop, as and for the purpose set forth.

12. In a machine of the class described, a rock-shaft, means normally tending to rock said shaft in one direction, a stop for restraining the rocking of said shaft, stitch-forming mechanism, a cord clamp and cutter, a crank-arm carried by said shaft and connected to said cord clamp and cutter, and means for tripping said stop, as and for the purpose set forth.

13. In a machine of the class described, a rock-shaft, means normally tending to rock said shaft in one direction, an arm mounted on said shaft and provided with a pin, a holding-arm adapted to engage said pin to lock said shaft against rotative movement, stitch-forming mechanism, a cord clamp and cutter, means operated by said shaft for actuating said clamp and cutter, and means for releasing said holding-arm from engaging relation with respect to said pin, as and for the purpose set forth.

14. In a machine of the class described, a rock-shaft, a cord-clamp, means actuated by said shaft for opening and closing said clamp, means normally tending to rock said shaft in a direction to close said clamp, a trip for locking said shaft in position to hold said clamp open, and means for releasing said trip, in combination with stitch-forming mechanism, as and for the purpose set forth.

15. In a machine of the class described, a rock-shaft, a cord-clamp, means actuated by said shaft for opening and closing said clamp, means normally tending to rock said shaft in a direction to close said clamp, a trip for locking said shaft in position to hold said clamp open, means for releasing said trip, and means for positively forcing said clamp to extreme closed position, in combination with stitch-forming mechanism, as and for the purpose set forth.

16. In a machine of the class described, a rock-shaft, a cord-clamp, means actuated by said shaft for opening and closing said clamp, means for positively rocking said shaft in a direction to close said clamp, a spring arranged to oppose said rocking means, a trip for holding said shaft against the action of said spring, means for releasing said trip, and means for positively rocking said shaft to the limit of its movement to close said clamp, in combination with stitch-forming mechanism, as and for the purpose set forth.

17. In a machine of the class described, a cord clamp and cutter, a cord-puller, a rotating shaft, means actuated therefrom for operating said cord-puller, a rock-shaft, means actuated therefrom for operating said cord clamp and cutter, and means actuated by said rotating shaft for rocking said rock-shaft, in combination with stitch-forming mechanism, as and for the purpose set forth.

18. In a machine of the class described, a rotating shaft, a wheel mounted thereon, a pin or projection carried by said wheel, a cam-arm arranged to be engaged and rocked by said pin or projection, a rock-shaft, a cooperating cam-arm mounted thereon, a cord-clamp, and connections operated by said rock-shaft for actuating said cord clamp and cutter, in combination with stitch-forming mechanism, as and for the purpose set forth.

19. In a bottle-cover-making machine, feeding and stitching devices, means for actuating the same, and a cord-clamp arranged to hold the cord in position to be engaged by the stitching mechanism, in combination with a rock-shaft, a cord-puller connected thereto and operated therefrom and arranged to engage the cord at a point between the cord-clamp and the cord-supply, an arm also connected to said rock-shaft, a cam-shaft, a pivotally-mounted arm arranged to be engaged by a cam on said shaft whereby it is periodically rocked, and connections between said pivotally-mounted arm and the arm on said rock-shaft for rocking the latter to actuate said cord-puller, as and for the purpose set forth.

20. In a bottle-cover-making machine, feeding and stitching mechanism, means for actuating the same, and a cord-clamp arranged to hold the cord in position to be engaged by the stitching mechanism, in combination with a cord-puller arranged to engage the cord at a point between the cord-clamp and the cord-supply, a rock-shaft having an arm, to which said cord-puller is connected, a cam-shaft, a pivotally-mounted forked arm, the cam on said cam-shaft operating within the fork of said arm whereby said arm is positively rocked in both directions, and connections between said arm and rock-shaft for rocking the latter to operate the cord-puller, as and for the purpose set forth.

21. In a bottle-cover-making machine, feeding and stitching mechanism, means for actuating the same, and a cord-clamp arranged to hold the cord in position to be engaged by the stitching mechanism, in combination with a cord-puller operating to engage the cord at a point between said cord-clamp and the cord-supply, a rock-shaft having an arm to which said cord-puller is connected, a cam-shaft, a pivotally-mounted forked arm, a cam on said shaft operating within the fork of said arm, and yielding connections between said arm and rock-shaft, as and for the purpose set forth.

22. In a bottle-cover-making machine, feeding and stitching mechanism, means for actuating the same, and a cord-clamp arranged to hold the cord in position to be engaged by the stitching mechanism, in combination with a rock-shaft having an arm, a cord-puller connected to said arm and arranged to engage the cord at a point between the cord-clamp and cord-supply, a cam-shaft, means for rotatively actuating the same, a pivotally-mounted arm arranged to be periodically engaged and rocked by a cam on said shaft, and yielding connections between said pivoted arm and rock-shaft for rocking the latter to operate the cord-puller, as and for the purpose set forth.

23. In a machine for making bottle-covers, feeding and stitching mechanism, means for actuating the same, and a cord-clamp arranged to hold the cord in position to be engaged by the stitching mechanism, in combination with a cord-puller arranged to engage the cord at a point between the cord-clamp and the cord-supply, a main drive-shaft for actuating said stitching and feeding mechanism, a counter-shaft rotatively actuated from said main drive-shaft, a rock-shaft having an arm to which said cord-puller is connected, a cam-wheel mounted upon said counter-shaft, said cam-wheel provided with cam projections, a pivotally-mounted forked arm, the cam projections upon said wheel operating within the fork of said arm to positively rock the same to the extreme limits of its movement in both directions, and connections between said pivoted arm and said rock-shaft for rocking the latter to operate the cord-puller, as and for the purpose set forth.

24. In a machine for making bottle-covers, feeding and stitching mechanism, means for actuating the same, and a cord-clamp arranged to hold the cord in position to be engaged by the stitching mechanism, in combination with a cord-puller arranged to engage the cord at a point between the cord-clamp and the cord-supply, and means for vibrating said cord-puller and operating to actuate said cord-puller in advance of the operation of the stitching mechanism, and means interposed between the cord-supply and the cord-puller for providing slack in the cord to be yielded up to said cord-puller, as and for the purpose set forth.

25. In a machine for making bottle-covers, feeding and stitching mechanism, means for actuating the same, and a cord-clamp arranged to hold the cord in position to be engaged by the stitching mechanism, in combination with a rock-shaft, a cord-puller connected to said shaft and arranged to engage the cord at a point between the cord-clamp and the cord-supply, a vibrating arm also arranged to engage the cord at a point between the cord-clamp and cord-supply, connections between said vibrating arm and said rock-shaft for actuating the former to provide a slack in the cord to be taken up by the cord-puller, and means for rocking said shaft, as and for the purpose set forth.

26. In a machine for making bottle-covers, feeding and stitching mechanism and means for actuating the same, in combination with a cord-clamp arranged to hold the cord in position to be engaged by the stitching mechanism, an arm arranged to engage the cord at a point between said clamp and the cord-supply to provide slack in the cord, a rock-shaft, connections between said shaft and arm for vibrating the latter, a cord-puller also connected to said rock-shaft and operating to engage the slack portion of the cord to form a loose end therein in advance of the operation of the stitching mechanism, and means for operating said rock-shaft, as and for the purpose set forth.

27. In a machine for making bottle-covers, feeding and stitching devices and means for actuating the same, in combination with a cord-clamp arranged to hold the cord in position to be engaged by the stitching mechanism, an arm arranged to engage the cord at a point between said clamp and the cord-supply, a rock-shaft having a crank, a rod respectively connected to said crank and arm for vibrating the latter, whereby when said rock-shaft is rocked said arm is vibrated to provide slack in the cord, a cord-puller also connected to said rock-shaft and arranged to engage the slack portion of the cord to draw the same out in position to form a free end, and means for rocking said rock-shaft, as and for the purpose set forth.

28. In a machine for making bottle-covers, a cord-clamp comprising a stationary guide having a finger or projection extending laterally from the end thereof, and a slide having a hook formed in the plane of the body thereof and operating in a plane parallel with the plane of said finger or projection, said hook projecting in the opposite direction with respect to said finger, and means for reciprocating said slide, whereby said hook is drawn past said finger to clamp the cord between said guide-finger and the hook of said slide, as and for the purpose set forth.

29. In a machine for making bottle-covers, a cord-clamp comprising a stationary guide having a lateral finger extending from the end thereof, a cutter pivotally mounted on said guide, and a reciprocatory slide operating in a plane parallel with respect to the plane of said finger and provided with a hook projecting in a direction opposite to the direction of said finger, said slide also provided with pins or projections arranged to engage said cutter to rock the same, and means for moving said slide whereby the cord is engaged by the hook therein and is drawn under said finger and clamped and said cutter is rocked to sever the cord, as and for the purpose set forth.

30. In a bottle-cover-making machine, the combination with feeding and stitching mechanism, means for actuating the same, and a cord-clamp arranged to hold the cord in position to be engaged by the stitching mechanism, of a cord-puller arranged to engage the cord at a point between said clamp and the cord-supply, and means operating in advance of the actuation of the stitching mechanism for moving said cord-puller to pull out a portion of the cord to form a loose end, as and for the purpose set forth.

In witness whereof I have hereunto set my hand, this 15th day of October, 1900, in the presence of the subscribing witnesses.

VALENTINE FLECKENSTEIN.

Witnesses:
GUY CHASE,
W. A. PFEIL.